United States Patent [19]

Nolan

[11] 4,075,268
[45] Feb. 21, 1978

[54] METHOD OF MAKING DUAL WALL PIPE WITH FOAM INSULATION BETWEEN PIPE WALLS

[76] Inventor: Harold L. Nolan, 1914 Elmhurst Drive, Arlington, Tex. 76012

[21] Appl. No.: 724,637

[22] Filed: Sept. 20, 1976

[51] Int. Cl.² .................. B29C 17/00; B29C 27/02; B29D 23/00; B29F 5/00

[52] U.S. Cl. .................................. 264/138; 156/258; 156/304; 156/503; 264/230; 264/248; 264/342 R; 264/294

[58] Field of Search ................ 138/149; 156/503, 304, 156/258, 306; 264/248, 342 R, 230, 294, 138

[56] References Cited

U.S. PATENT DOCUMENTS

| | | | |
|---|---|---|---|
| 3,013,925 | 12/1961 | Larsen | 156/503 |
| 3,677,303 | 7/1972 | Martin | 138/149 |
| 3,929,541 | 12/1975 | Spears et al. | 156/503 |

OTHER PUBLICATIONS

Randolph et al., Plastics Engineering Handbook, Reinhold, New York, (1960) p. 288.

*Primary Examiner*—Willard E. Hoag
*Attorney, Agent, or Firm*—Wofford, Felsman, Fails & Zobal

[57] ABSTRACT

A section of conduit is insulated by a thermoplastic outer pipe and an insulating layer of foamed or beaded insulating material disposed in the annular space between the outer pipe and the conduit. The annular layer is preformed to substantially the size of the annular space, then the outer pipe is heated to cause expansion of its diameter and facilitate insertion of the annular layer within the outer pipe. The inner pipe, or the conduit, may also be thermoplastic and may be cooled to cause contraction to facilitate insertion of the annular layer over it. After the outer pipe and inner pipe have returned to ambient temperature, the annular layer is retained within by a shrink fit, without chemical bonding between the annular layer and the pipes. Sections of the pipe are joined by simultaneously heating the ends of the inner pipe, annular layer, and outer pipe, placing the ends of one section against the ends of the other section, and allowing them to fuse while cooling.

14 Claims, 6 Drawing Figures

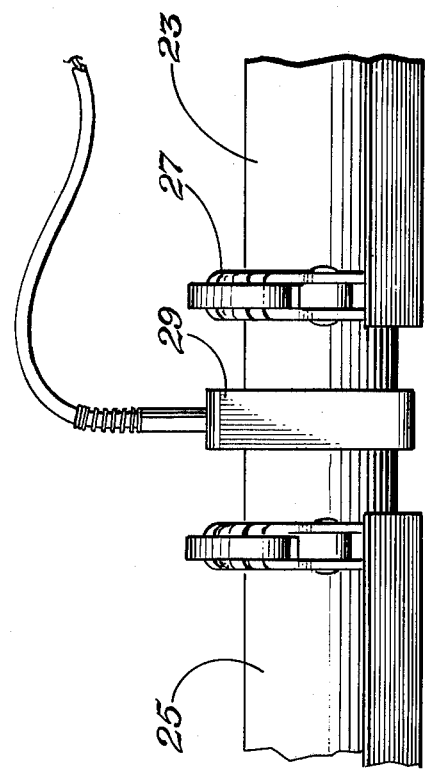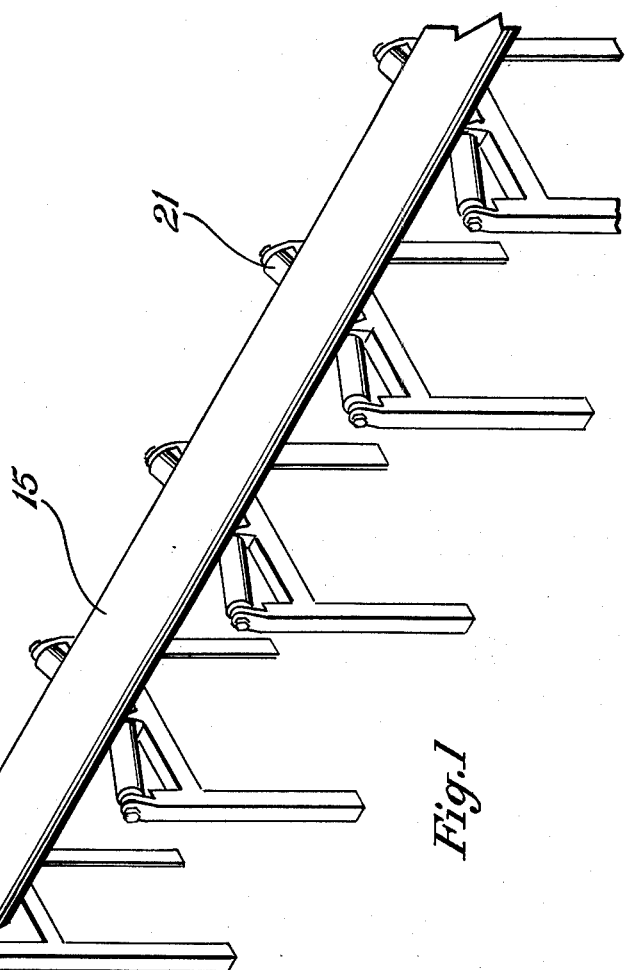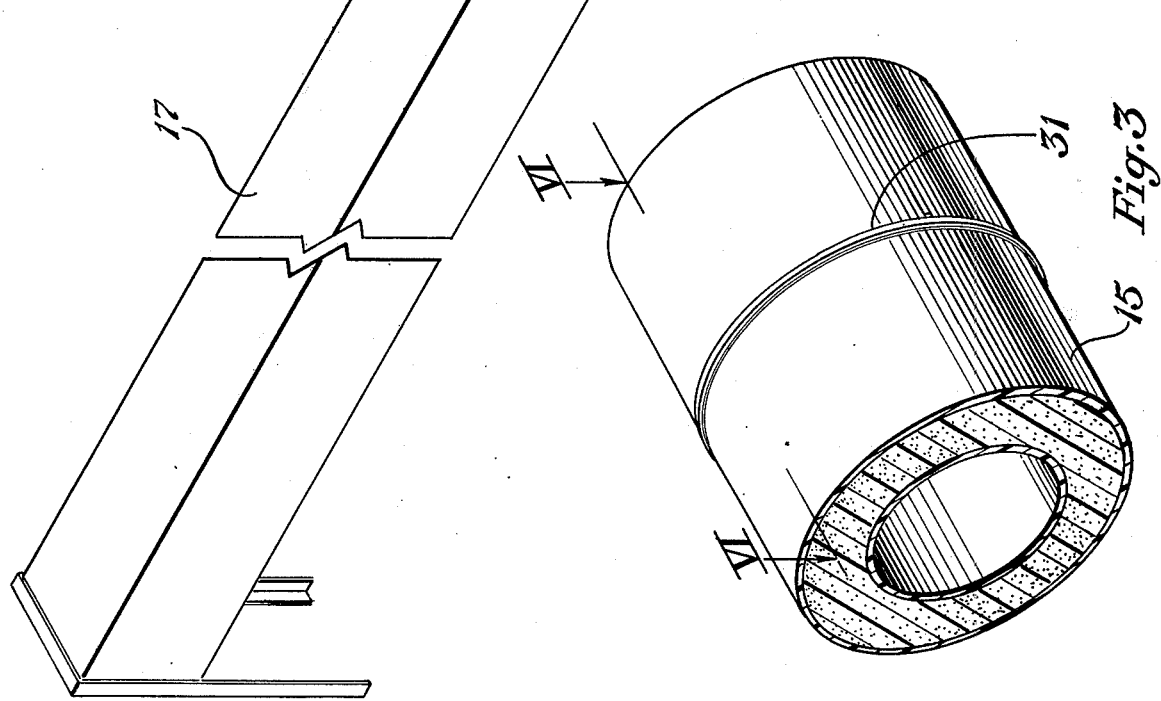

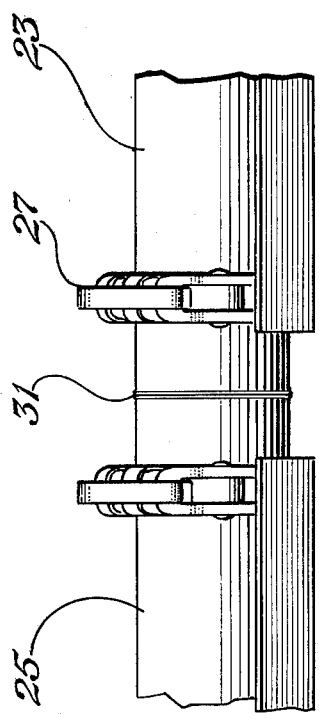
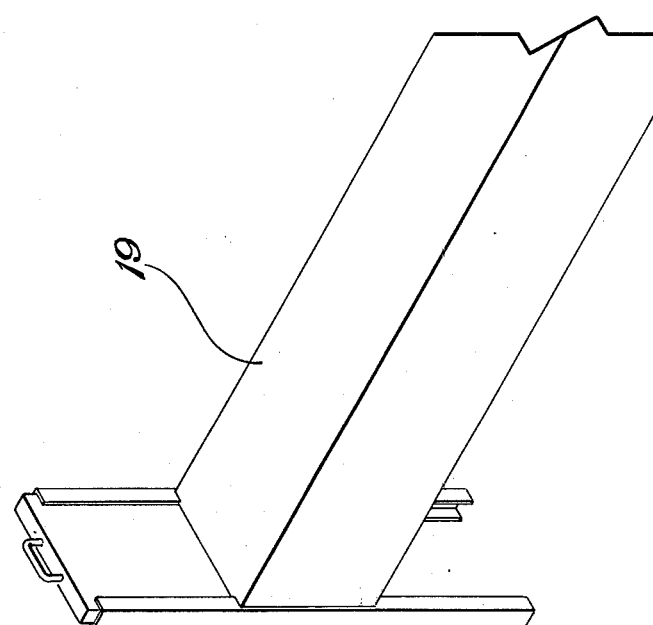
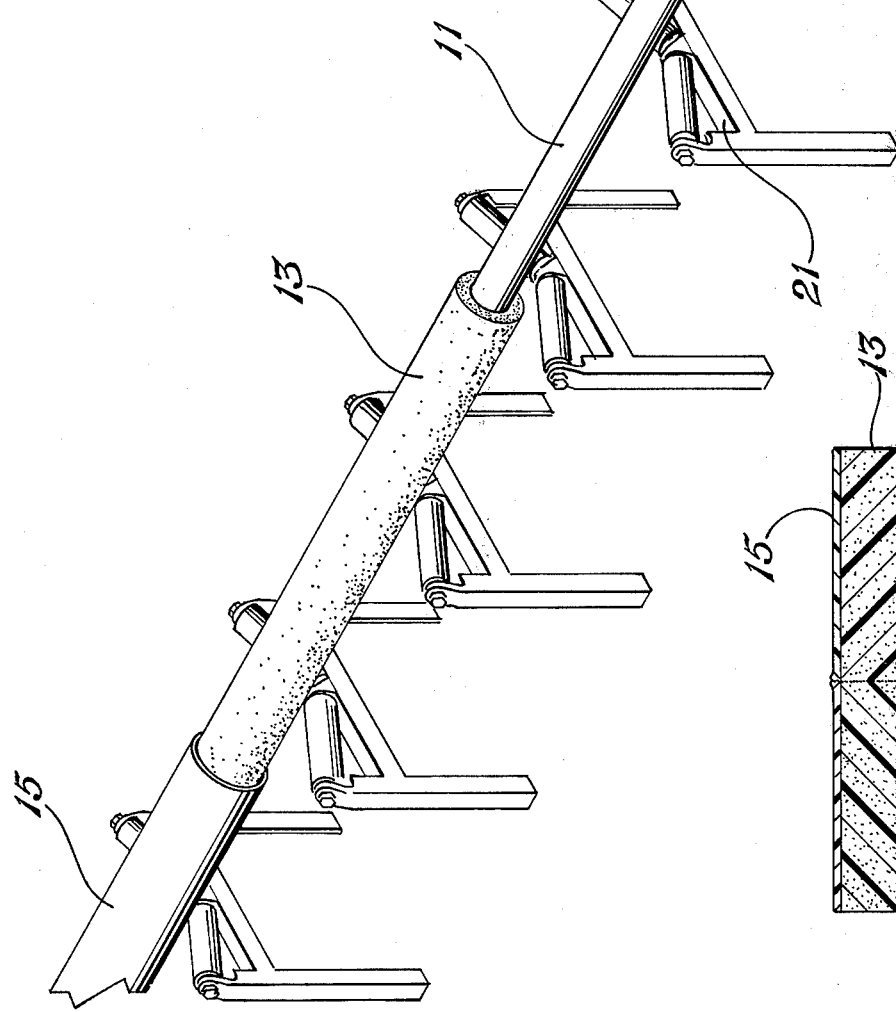
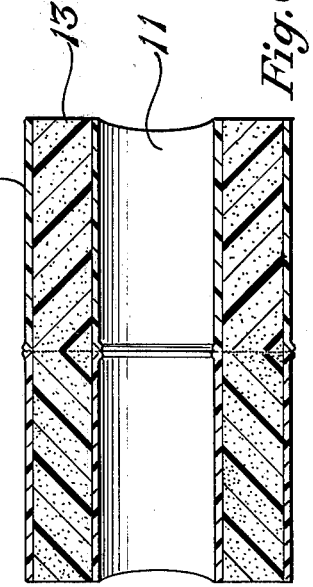

METHOD OF MAKING DUAL WALL PIPE WITH FOAM INSULATION BETWEEN PIPE WALLS

BACKGROUND OF THE INVENTION

1. Field of the Invention

This invention relates in general to thermoplastic insulation for conduits and inparticular to a thermoplastic outer pipe with an annular layer of foamed insulating material.

2. Description of the Prior Art

Conduits for carrying chilled water, such as used in building complexes, should be thermally insulated. In addition, conduits exposed to cold atmospheric temperatures must be thermally insulated.

One known method of thermally insulating a section of conduit is to place a thermoplastic outer pipe over the section of conduit, centralize it with standoffs, then blow foamed thermoplastic material, normally liquid urethane, into the annular space. Heat is generated in the foaming process, and once cooled, the foamed urethane is semirigid. The urethane is chemically bonded to the conduit and outer pipe in the sense that it adheres to the walls other than by friction, although it is not fused with the walls.

It is difficult with this technique to achieve uniformity in thickness of the annular layer. The heat generated tends to distort the inner and outer pipes, standoffs are difficult to retain in place, and voids often result. The resulting product thus fails to insulate as well as desired. In addition bursting strength may be lowered if voids result, since the bursting strength depends partially on even and uniform contact with the outer pipe, annular layer, and conduit.

In addition joining double walled insulated pipe while installing or laying is difficult and time consuming. The inner pipe ends and outer pipe ends are not joined simultaneously since they normally are not truly concentric. They are joined in separate operations with insulating material spliced in.

SUMMARY OF THE INVENTION

It is accordingly an object of this invention to provide an improved conduit insulation, and a method of constructing and of joining the same.

It is a further object of this invention to provide an improved method of constructing and joining an insulated section of conduit having inner and outer thermoplastic pipes and an annular layer of insulating material.

It is a further object of this invention to provide an improved insulated conduit with inner and outer thermoplastic pipes and an annular layer of foamed insulating material, that is constructed without blowing liquid foamed plastic into the annular space.

In accordance with these objects, a thermoplastic outer pipe is used that has a coefficient of expansion sufficiently high so that it will expand a significant amount when heated to a temperature slightly below at which it commences to distort. The insulating material, normally foamed thermoplastic is precast in blocks, then cut to substantially the size of the annular space at ambient temperature. The outer pipe is heated to expand its diameter, and while still hot, the annular layer is inserted within the outer pipe and over the conduit. The conduit may also be a thermoplastic material. If its thermal coefficient of expansion is sufficiently high to create a significant contraction, it may be cooled to cause contraction to facilitate insertion into the annular layer. The resulting insulated conduit is void free, uniform in size, and retained within the annular space only by friction caused by the shrink fit.

The sections of insulated conduit with inner and outer thermoplastic pipes are joined by simultaneously heating the inner and outer pipe ends then holding the ends together to fuse while cooling.

BRIEF DESCRIPTION OF THE DRAWINGS

FIGS. 1 and 2 are fragmentary perspective views of the apparatus used for insulating the conduit in accordance with this invention.

FIG. 3 is a perspective view of a portion of the insulated conduit, constructed in accordance with the teachings of this invention.

FIG. 4 is an elevational view showing a method of joining two inner sections and outer conduit in accordance with this invention.

FIG. 5 is a view of FIG. 4, with the heated plate removed and the two sections pressed together for joining.

FIG. 6 is a vertical cross sectional view of FIG. 3 along the lines VI—VI.

DESCRIPTION OF THE PREFERRED EMBODIMENT

Referring to FIGS. 1 and 2, a conduit 11 is shown being insulated in accordance with the teachings of this invention. A foamed or beaded insulating layer, such as urethane or foamed glass 13, is being drawn over conduit or inner pipe 11. Annular layer 13 is simultaneously being inserted into an outer thermoplastic pipe 15, as it is being removed from a heating chamber or oven 17. In the preferred embodiment, the inner pipe 11 is also a thermoplastic material, and is shown being removed from a cooling chamber or a refrigerator 19 for contacting its diameter. The inner pipe 11, however, may be steel, or a material that has an insignificant coefficient of thermal expansion, thus eliminating the refrigerator 19.

The outer pipe 15 is preferably either high or low density or ultra-high molecular weight high density polyethelene. If thermoplastic pipe is being used for the inner pipe 11, it is also preferably the same polyethene. The outer pipe 15 has a coefficient of linear thermal expansion of at least $4.0 \times 10^{-5}$ inch/inch ° F in the temperature range from 25° to 175° F. It has a minimum temperature of which distortion begins to occur of at least 145° F, preferably in the range from 158° to 174° F. One suitable polyethelene pipe is sold under the trademark "Driscopipe 7600" Industrial Pipe manufactured by Phillips Petroleum Co. Another is known as "Nipak" pipe manufactured by Nipak, Inc. As measured according to ASTM D696 (American Society for Testing Materials), "Driscopipe" has a coefficient of thermal expansion of $1.2 \times 10^{-4}$, while "Nipak" has a coefficient of thermal expansion as follows: 15° to 85° F — $7.2 \times 10^{-5}$; 85° to 155° F — $8.3 \times 10^{-5}$; 150° to 200° F — $9.5 \times 10^{-5}$ (all inch/inch ° F).

The outer pipe 15 is preferably heated in the oven to a temperature in the range from 145° to 174° F, the upper temperature being limited by the heat at which damaging distortion will occur. A typical insulating conduit size is three inch line pipe inner pipe and five inch line pipe outer pipe. The O. D. (outer diameter) of the three inch pipe is 3.5 inches, while the O. D. of the outer pipe is 5.25 inches. For low pressure pipe, the I. D. (inner diameter) of the five inch pipe is approximately 4.93 inches. This requires an annular layer 13 of 1.43 inches in thickness, with the annular layer's I. D. equal to the O. D. of the 3 inch and the annular layer's O. D. equal to the I. D. of the 5 inch pipe. Regardless of the inner pipe diameter, the annular layer thickness is expected to be approximately ½ to 2 inches in thickness. The I. D. of a 5 inch "Driscopipe" section will expand 0.063 inches when heated from 72° to 172° F, increasing the I. D. to approximately 4.99 inches.

The annular layer 13 is preferably urethane cut to size from blocks by a device (not shown) having an auger and a rotating external sleeve. In the above example, the annular layer 13 would be cut substantially to size, that is with a 4.93 inch O. D. and a 3.5 inch I. D. This will give a clearance when the outer pipe 15 is heated to 172° F of approximately 60 thousandths of an inch between the outer pipe 15 and the annular layer 13, which is sufficient for the annular layer 13 to be manually forced into it. Once the outer pipe 15 has cooled to ambient, there should be a friction or shrink fit. The urethane layer 13 is compressible to a certain extent, facilitating insertion.

Since the circumferential area of the inner pipe 11 is less than the circumferential area of the outer pipe 15, the frictional resistance resulting when forcing the annular layer into the annular space is less, thus contracting the diameter of the inner pipe by cooling is optional. If polyethelene inner pipe is used, however, a tighter fit with the inner pipe 11 and the annular layer 13 may be achieved. The preferred cooling range is to a temperature between 25° and 45° F. If three inch "Driscopipe" inner pipe is cooled from 72° to 25° F, its O. D. will decrease from 3.5 inches to 3.48 inches, providing 20 thousandths clearance. The I. D. of the annular layer 13 may be cut at 3.5 inches, creating a tight shrink fit once the temperature is returned to ambient.

In the preferred method, if both inner and outer polyethelene pipes are used, preferably the heating and cooling is performed simultaneously by the oven 17 and refrigerator 19, which are spaced apart by the length of one section, normally approximately 38 feet. Precut annular layers 13 will be stored near guide rollers 21. Once the inner and outer pipes uniformally obtain the temperature within the respective heating and cooling chambers, an annular layer 13 is placed on the guide rollers. The annular layer 13 is inserted into the annular space by manually forcing both inner and outer pipes toward each other until the annular layer is completely enclosed within, as indicated in FIG. 3. The interfaces between the annular layer and the inner pipe and outer pipe are free of chemical bonding.

FIGS. 4 and 5 show a method of joining two sections, 23, 25 of insulated conduit with inner and outer pipes of polyethelene by heat or butt fusion. Butt fusion is normally performed in the field as the conduit is being laid and is a technique used when joining single wall polyethelene pipe, although it is not known to be used with double wall insulated pipe. The joinder is performed by smoothing or squaring each end so that the ends of the outer pipe 15, annular layer 13, and inner pipe 11 are flush. The ends of each section 23, 25 are clamped in a holding device 23 to maintain the ends aligned. A heater element 29 is placed between the conduits 23, 25 and the ends brought into contact with it. The heater element, at a temperature of 475° – 500° F, is maintained in contact with the ends until they are softened 1/16 inch to 3/16 inch back. The element 29 is removed, then the ends are brought together quickly and held under pressure until hardened. This fuses the polyethelene pipes, forming a seam or bead 31, as shown in FIGS. 3, 5 and 6. The force applied while fusing should be sufficient to cause the beads 31 to approximately double in size. Both the inner and outer pipes will form a bead 31, as shown in FIG. 6.

The urethane annular layer 13 in each section does not fuse to the outer annular layer. The urethane does not melt, but becomes sticky and tends to join to the adjacent urethane layer, substantially forming a vapor proof barrier. The insulating K factor is approximately the same through the junction of the urethane layers as in the adjacent urethane material. The same type of holding device 27 and heater element 29 as are presently used with the butt fusion of single polyethelene pipe, may be used with dual insulated polyethelene pipe.

It should be apparent that an invention having significant advantages has been provided. A method of insulating a section of conduit is provided that gives an insulation layer of uniform thickness that is free of large voids since the insulation is not blown in. If inner and outer polyethelene pipes are used, the insulated conduit may be quickly joined with other sections.

The foregoing disclosure and the showings made in the drawings are merely illustrative of the principles of this invention and are not to be interpreted in a limiting sense.

I claim:

1. A method of insulating a conduit comprising:
   heating a thermoplastic pipe to cause expansion of its diameter; the thermoplastic pipe being larger in diameter than the conduit, forming an annular space between the thermoplastic pipe and the conduit when the conduit is carried concentrically within the thermoplastic pipe;
   forming an annular layer of insulating material of a size substantially equal to the annular space when the thermoplastic pipe is at ambient temperature;
   inserting the conduit into the annular layer; and
   inserting the annular layer into the thermoplastic pipe while the thermoplastic pipe is at an elevated temperature, to facilitate insertion.

2. The method according to claim 1 wherein the thermoplastic pipe is heated to a temperature within the range of 145° – 174° F.

3. The method according to claim 1 wherein the annular layer is urethane.

4. The apparatus according to claim 1 wherein the thermoplastic pipe is heated in an oven.

5. The method of claim 1 wherein said forcing step causes formation of a bead about both said inner and outer pipes.

6. The method according to claim 1 wherein the linear thermal expansion coefficient is greater than $4 \times 10^{-5}$ inch/inch ° F, for the temperature range 25° – 175° F.

7. The method according to claim 6 wherein the thermoplastic pipe is polyethelene.

8. A method of constructing a section of insulated conduit having inner and outer concentric polyethelene pipes and an annular layer of insulating material carried between, comprising:
   heating the outer pipe to cause expansion of its diameter to facilitate insertion of the annular layer;
   forming the annular layer to a size substantially equal to the annular space between the inner and outer pipes when at room temperature; and
   inserting the inner pipe into the annular layer and inserting the annular layer into the outer pipe while the outer pipe is maintained at an elevated temperature.

9. The method according to claim 8 further including the steps of joining two sections of the insulated conduit, comprising:
squaring off the ends of each section of insulated conduit so that the ends of the inner pipe, outer pipe, and annular layer are flush;
heating the ends of the inner pipe, outer pipe, and annular layer of each conduit simultaneously with a heater plate until the edges of the inner and outer pipes soften;
removing the heater plate and forcing the ends of each section of the conduit together under pressure while allowing to cool.

10. A method of constructing and joining sections of insulated conduit having inner and outer concentric polyethelene pipes and an annular layer of insulating material carried between, comprising:
forming the annular layer to a size substantially equal to the annular space between the inner and outer pipes;
inserting the inner pipe into the annular layer and inserting the annular layer into the outer pipe;
squaring off the ends of each section of insulated conduit so that the ends of the inner pipe, outer pipe, and annular layer are flush;
heating the ends of the inner pipe, outer pipe, and annular layer of each conduit simultaneously with a heater plate until the edges of the inner and outer pipes soften;
removing the heater plate and forcing the ends of each section of the conduit together under pressure while allowing to cool.

11. A method of constructing a section of insulated conduit having inner and outer concentric polyethelene pipes and a foamed urethane annular layer carried between, comprising:
heating the outer pipe to cause expansion of its diameter to facilitate insertion of the annular layer;
cooling the inner pipe to cause contraction of its diameter to facilitate insertion of the annular layer;
forming the annular layer to a size substantially equal to the annular space between the inner and outer pipes when at ambient temperatures; and
inserting the inner pipe into the annular layer while at a cool temperature and inserting the annular layer into the outer pipe while at an elevated temperature.

12. The method according to claim 11 wherein the step of heating the outer pipe includes:
placing the outer pipe in an oven maintained at a temperature within the range 145° to 174° F, for heating until the outer pipe temperature equals the temperature of the oven.

13. The method according to claim 12 wherein the step of cooling the inner pipe includes the step of placing the inner pipe in a chamber cooled to a temperature within the range of 25° – 45° F, for cooling until the inner pipe temperature equals the temperature of the cooling chamber.

14. The method according to claim 13 wherein the steps of inserting the inner pipe into the annular layer and the annular layer into the outer pipe are performed in normal room temperatures, but while the inner and outer pipes are still substantially at their cooled and elevated temperatures respectively.

* * * * *